June 26, 1945.  J. E. MULHEIM  2,379,176
BRUSH RIGGING
Filed March 20, 1943  2 Sheets-Sheet 1

WITNESSES:

INVENTOR
Joseph E. Mulheim.
BY
ATTORNEY

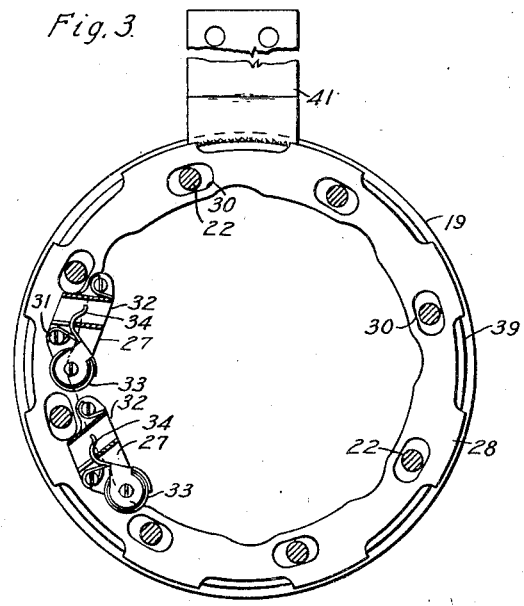
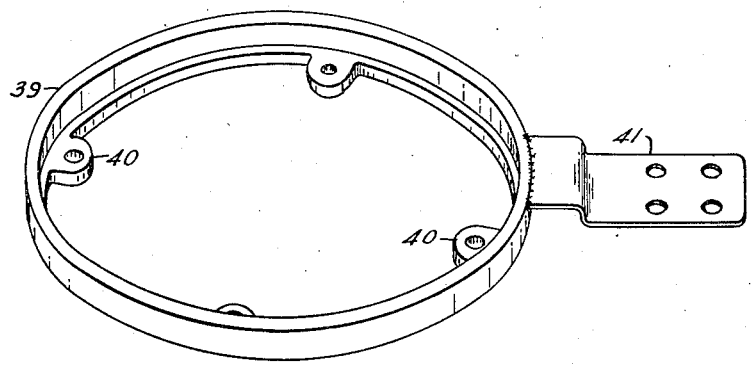

Patented June 26, 1945

2,379,176

UNITED STATES PATENT OFFICE 2,379,176

BRUSH RIGGING

Joseph E. Mulheim, Lima, Ohio, assignor to Westinghouse Electric Corporation, East Pittsburgh, Pa., a corporation of Pennsylvania Application March 20, 1943, Serial No. 479,851

15 Claims. (Cl. 171—324)

The present invention relates to brush rigging for dynamoelectric machines, and more particularly to brush rigging for machines of relatively small physical size and high capacity, such as generators for use on aircraft.

Direct-current generators such as are used to supply the electrical load on airplanes are necessarily of small physical size and light weight, but they must have relatively high capacity. The brush rigging for such machines must be capable of withstanding severe vibration, and it must be so designed that it will not interfere with the free flow of ventilating air through the machine, since the required high capacity and small size of such machines make it necessary to provide the most effective ventilation possible. The brush rigging must also permit the brushes to be shifted to adjust them accurately on the electrical neutral, and it must be sufficiently rigid to accurately maintain the adjustment under the severe conditions of vibration which may be encountered in service.

In aircraft generators of the smaller sizes, these requirements can be met without too much difficulty, since the leads from the brushes to the field windings are small enough to be flexible and can be connected directly to the brushholders, so that a relatively simple structure can be utilized. In the case of generators of the higher capacities, however, such as those rated at currents of 400 amperes and higher, the leads from the field windings are necessarily rather large in order to carry the high currents, and they are therefore relatively stiff and rigid so that if they were connected directly to the brushholders, the brushes could not be shifted. For this reason, special provision must be made to allow the brushes to be shifted, and the field leads can not be connected directly to the brushholders. An obvious solution of this problem, of course, would be to use large, flexible, woven conductors for the field leads which could be connected to the brushholders and which would permit the brushes to be shifted. The space limitations in aircraft generators and the conditions of vibration which they must be designed to withstand, however, make it impractical to use such woven conductors, since the space available for the field leads is so small that there would be danger of the flexible leads vibrating into contact with parts of the machine of opposite polarity, thus causing a short-circuit.

The principal object of the present invention is to provide a brush rigging assembly for dynamoelectric machines of small physical size and high capacity which will permit the brushes to be shifted without requiring flexibility in the leads to the field windings.

A further object of the invention is to provide a brush rigging assembly which is of rigid construction to withstand the effects of vibration, and which will positively and reliably maintain the brushes in their adjusted position even under severe conditions of vibration.

Another object of the invention is to provide brush rigging for dynamoelectric machines of small size and high capacity which will not interfere with the free flow of ventilating air through the machine.

Still another object of the invention is to provide brush rigging for dynamoelectric machines which can easily be assembled, and which is so designed that the machine can readily be disassembled without breaking any permanent electrical connections.

Other objects and advantages of the invention will be apparent from the following detailed description, taken in connection with the accompanying drawings, in which.

Figure 1:
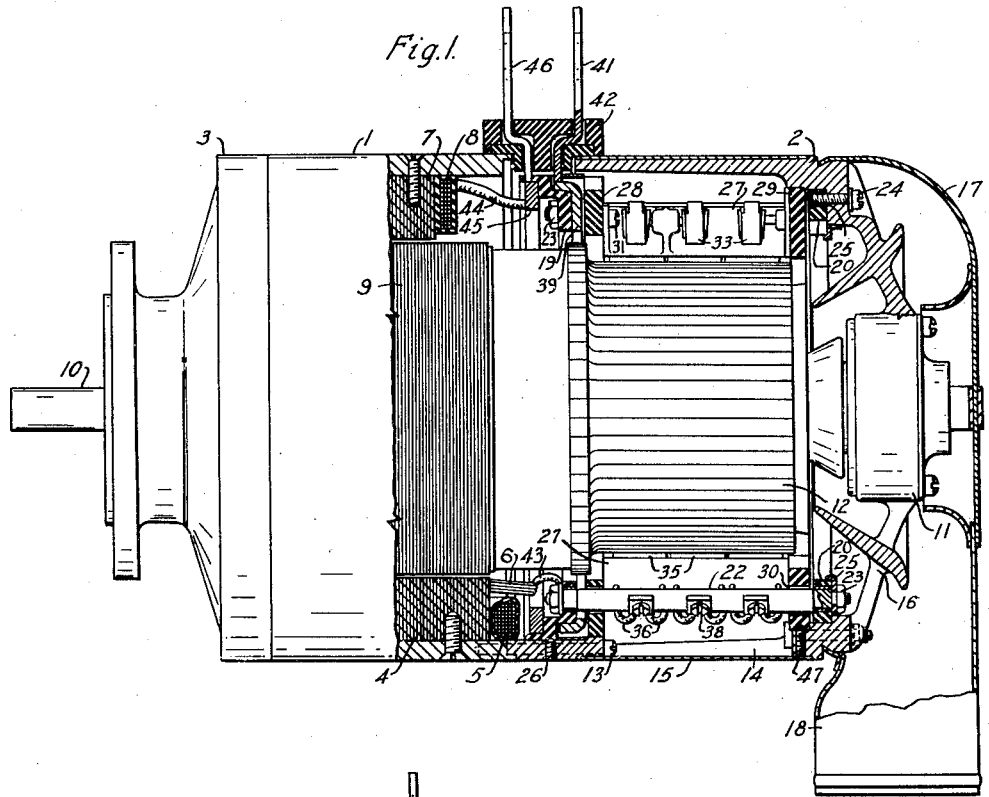
Figure 1 is a longitudinal sectional view, partly in elevation, of an aircraft generator embodying the invention.
Figure 2:
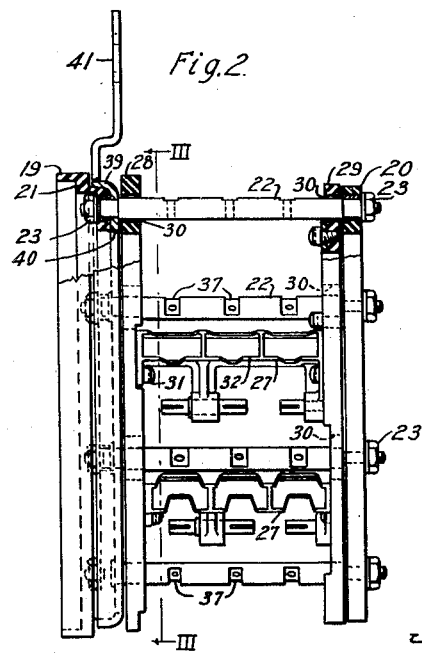
Fig. 2 is a side elevation, partly in section, of the brush rigging shown in Fig. 1, some of the brushholders being omitted for clarity of illustration.

Fig. 3 is a transverse sectional view of the brush rigging, approximately on the line III—III of Fig. 2, and Fig. 4 is a perspective view of a connector ring The invention is shown in Figure 1 embodied in a direct-current generator for aircraft use. As stated above, the invention is particularly adapted for machines of relatively high rating, although its usefulness is not necessarily restricted to such machines, and the particular machine shown in the drawings for the purpose of illustration is a direct-current generator rated at 800 amperes and 30 volts, although it will be understood that the invention may be used in machines of other types and ratings. The generator has a frame 1, which may be of any suitable or usual construction, and which is closed at the commutator end by an end bracket 2, and at the opposite end by an end bracket 3 of any suitable construction. The frame 1 has mounted on it a plurality of main pole pieces 4 with suitable main field windings 5, and with compensating windings 6 disposed in the pole faces. Interpoles 7 are also mounted on the frame 1 and are provided with suitable interpole windings 8. The generator has a rotor member 9, of any suitable construction, mounted on a shaft 10 which is supported in bearings, one of which is indicated at 11, mounted in the end brackets 2 and 3. The rotor member includes a commutator 12 which is positioned in the end bracket 2.

The end bracket 2 is made sufficiently long to extend over the entire length of the commutator 12, and is attached to the frame 1 by means of suitable screws 13. The end bracket 2 may be provided with openings 14 to permit access to the brushes, these openings being normally closed by a cover 15. The end bracket 2 also has suitable openings 16 for the entrance of ventilating air, and, if desired, a hood or cover 17 may be attached to the end bracket over the openings 16 and provided with an air connection 18 for the attachment of an air duct or blast tube through which a strong blast of air may be supplied to provide blast cooling for the generator, as is customary for aircraft generators.

The brush rigging is positioned inside the end bracket 2. The brush rigging includes a pair of carrier rings 19 and 20 made of a suitable insulating material, such as Micarta. As shown in Figs. 1 and 2, the ring 19 has an annular flange which is adapted to fit snugly inside the end bracket 2, and it has an internal shoulder 21 and an inwardly extending radial flange. The ring 20 is a plane annular ring which is adapted to fit snugly inside the bracket 2 at the opposite end from the ring 19. The rings 19 and 20 are mechanically connected and spaced apart by a plurality of conducting rods 22, which are preferably made of copper, and which correspond in number to the number of brushholders to be used. Each of the rods 22 has a reduced portion at each end, forming a shoulder at each end, and the reduced portions extend through openings in the rings 19 and 20, which may be provided by metal inserts molded in the rings. The rings are clamped against the shoulders of the rods 22 by means of nuts 23, so that the rings 19 and 20 and rods 22 form a mechanically rigid, cage-like structure which is adapted to fit in the inside of the end bracket 2.

The assembly consisting of the rings 19 and 20 and rods 22 is secured in position in the bracket 2 by means of screws 24 which pass through the end bracket and are threaded into metal inserts 25 molded in the ring 20. Since the ring 19 is rigidly connected to the ring 20 by means of the rods 22, the entire assembly is thus rigidly supported in the end bracket, but if desired, as an additional precaution against loosening of the assembly as a result of continued vibration, one or more threaded dowel pins 26 may be inserted through holes in the opposite end of the end bracket 2 and threaded into the periphery of the ring 19.

The generator is provided with a plurality of brushholders 27 which may be of any usual or desired construction, and which are supported between a pair of rocker rings 28 and 29. The rocker rings 28 and 29 are made of a suitable insulating material, such as Micarta, and each ring has a plurality of elongated slots 30 formed in it, corresponding in number and angular position to the rods 22. The brushholders 27 are rigily secured to the rings 28 and 29 by means of screws 31, so that the brushholders 27 and the two rocker rings 28 and 29 also form a mechanically rigid, cage-like structure.

The brushholders 27 may be of any suitable type, and have been shown as comprising brush boxes 32 carrying pins at one side on which are mounted spiral springs 33 bearing against fingers 34 which are adapted to engage the top surfaces of the brushes 35.

In assembling the brush rigging, the cage structure consisting of the rocker rings 28 and 29 and brushholders 27, is mounted on the rods 22, with the rods extending through the elongated slots 30. Thus, each of the cage-like structures is mechanically rigid and independent of the other, but the rocker rings and brushholders are supported by the rods 22 and are angularly movable with respect to the rods because of the elongated slots 30. The brush leads or shunts 36 from the brushes of each brushholder are connected to the adjacent rod 22. Each of the rods 22 has a plurality of flat grooves 37 cut in it, and the brush shunts 36 are secured in these grooves, as by screws 38. Thus, the rods 22 serve as rigid conductors or bus bars to which the individual brushes are connected, each rod being connected to the brushes of the adjacent brushholder so that adjacent rods 22 are connected to brushes of opposite polarity. The particular machine shown in the drawings for the purpose of illustration is an eight-pole machine, and there are therefore eight brushholders 27 and eight rods 22, four of the rods being connected to positive brushes and the intervening four rods being connected to negative brushes.

The four rods 22 of one polarity, for example, those connected to the positive brushes, are connected together by means of a connector ring 39. As shown in Figs. 2 and 4, the ring 39, which is preferably made of copper, has an annular flange which is adapted to fit over the ring 19, and it has a plurality of inwardly extending lugs 40 corresponding in number to the rods 22 of one polarity. The lugs 40 of the ring 39 are clamped between the ring 19 and the shoulders on the rods 22 of one polarity, all the rods of one polarity being engaged by the lugs 40 so that these rods are all connected together by the ring 39. The radial width of the intermediate portions of the ring between the lugs 40 is such that the ring is spaced away from the intervening rods 22 of opposite polarity. The ring 39 has a copper strap lead 41 brazed to it at one side, and this lead extends out of the machine through a slotted block 42 of suitable insulating material, which may be placed in a recess in the end bracket 2.

The other rods 22 of opposite polarity are preferably connected individually by means of leads 43 to the field windings. In the particular machine shown, the leads 43 are connected to the compensating windings 6, which are connected in series with the interpole windings 8. The leads 44 from the other ends of the interpole windings are brought out at a plurality of points around the frame and are brazed or otherwise permanently connected to a copper connector ring 45. The ring 45 is made of the proper size to fit inside the annular flange of the carrier ring 19 and seats against the internal shoulder 21 of this ring. A strap lead 46 is brazed to the ring 45 and extends out through the slotted block 42 for connection to the external circuit. The leads from one end of the main field winding 5 may also be connected to the connector ring 45, and the leads from the opposite end of the main field winding 5 may be brought out of the machine separately for connection to the external circuit, or they may be connected to the positive brushes in any other suitable manner. It is to be understood that although a particular connection and arrangement of the field windings has been described in order to illustrate the manner in which the connections to the brush rigring are made, the invention is not limited to this particular arrangement, and it will be obvious that the leads 43 from the rods 22 may be connected to the field windings in any desired manner, and that the connections to the external circuit can be made in other ways, within the scope of the invention.

Since the brushholders are supported on the fixed rods 22 by means of the rocker rings 28 and 29, the brushes can be shifted with respect to these rods and to the commutator by reason of the elongated slots 30 in the rings 28 and 29. Thus the brushes can readily be adjusted to place them accurately on the electrical neutral. After the adjustment has been made, the rocker rings are held in the adjusted position by means of a threaded dowel pin 47 which passes through the end bracket 2 and is threaded into the ring 29. Since the rings 28 and 29 are rigidly connected together by the brushholders 27, they are reliably and positively held in the adjusted position by means of the dowel pin 47.

It should now be apparent that a brush rigging construction has been provided for dynamoelectric machines of large capacity and small physical size, such as aircraft generators, which is very rigid mechanically, so that it is capable of withstanding severe vibration, and which permits the brushes to be shifted for adjustment without requiring the leads in the field windings to be flexible. This result is accomplished by means of the mounting of the rocker rings 28 and 29 on the fixed conducting rods 22 which serve as bus bars, so that the only flexibility required to permit the adjustment is in the brush shunts 36, which must be flexible in any event in order to permit the brushes to move radially in the brushholders as they wear down. The brush rigging is relatively simple and is easily assembled, and it is so arranged that it offers no substantial interference to the free flow of ventilating air through the machine, since the rings are so proportioned, as shown in Fig. 1, that there is ample space for the passage of air between the rings and the commutator.

This construction also has another important advantage in that it permits complete disassembly of the generator without requiring any permanent electrical connections to be broken. Thus, the end bracket 2 can be removed by taking out the dowel pins 26 and 47 and the screws 24 to release it from the brush rigging, and it can then be withdrawn from the machine merely by removing the screws 13. If it is desired to also remove the brush rigging itself, after the end bracket 2 has been taken off, the brush rigging can be removed from the machine as a unit simply by removing the leads 43 from the rods 22 to which they are connected, which is easily done by loosening the nuts 23 on the ends of the rods. When these leads have been disconnected, the brush rigging can be removed as a complete unitary assembly without breaking any soldered or brazed connections. The connector ring 45 is supported on the ring 19 but is not attached to it, so that the brush rigging can be removed leaving the ring 45 supported by the leads 44 which, as previously explained, are relatively stiff and rigid, and are attached to the ring 45 at a plurality of points around the frame. Thus, the generator can be entirely disassembled without breaking any permanent electrical connection, which greatly facilitates maintenance of the machine. This is an important advantage in many applications, such as generators for military aircraft, where speed and ease of maintenance and inspection are of great importance.

It will be apparent that although a particular embodiment of the invention has been shown for the purpose of illustration, various other embodiments and modifications are possible within the scope of the invention. It is to be understood therefore that the invention is not restricted to the specific details of construction shown and described, but that in its broadest aspects it includes all equivalent embodiments and modifications which come within the scope of the appended claims.

I claim as my invention:

1. In a dynamoelectric machine having a rotatable commutator, a plurality of conducting rods extending axially past the commutator, said conducting rods being spaced apart around the circumference of the commutator and mounted in fixed position relative to the commutator, a plurality of brushholders disposed around the commutator, supporting means for holding said brushholders in fixed position relative to each other, said supporting means being carried by said conducting rods and being capable of angular adjustment relative to the commutator, brushes in said brushholders engaging the commutator, and flexible means for connecting each brush to a corresponding one of said conducting rods.

2. In a dynamoelectric machine having a rotatable commutator, a plurality of conducting rods extending axially past the commutator, said conducting rods being spaced apart around the circumference of the commutator, a plurality of brushholders disposed around the commutator, supporting means for holding said brushholders in fixed position relative to each other, said supporting means being carried by said conducting rods and being capable of angular adjustment relative to the commutator, brushes in said brushholders engaging the commutator, flexible means for connecting each brush to a corresponding one of said conducting rods, and means for connecting together all the conducting rods which are connected to the brushes of one polarity.

3. In a dynamoelectric machine having a rotatable commutator, a plurality of conducting rods extending axially past the commutator, said conducting rods being spaced apart around the circumference of the commutator and mounted in fixed position relative to the commutator, a plurality of brushholders disposed around the commutator, supporting means for holding said brushholders in fixed position relative to each other, said supporting means being carried by said conducting rods and being capable of angular adjustment relative to the commutator, means for retaining said supporting means in adjusted position, brushes in said brushholders engaging the commutator, flexible means for connecting each brush to a corresponding one of said conducting rods, and means for connecting together all the conducting rods which are connected to the brushes of one polarity.

4. In a dynamoelectric machine having a stator member and a rotor member, said stator member including an end bracket at one end thereof, and said rotor member including a commutator positioned in said end bracket, a plurality of axially extending conducting rods supported in fixed position in the end bracket, said conducting rods being spaced apart around the circumference of the commutator, a plurality of brushholders disposed around the commutator, supporting means for holding said brushholders in fixed position relative to each other, said supporting means being carried by said conducting rods and being capable of angular adjustment relative to the commutator, brushes in said brushholders engaging the commutator, and flexible means for connecting each brush to a corresponding one of said conducting rods.

5. In a dynamoelectric machine having a stator member and a rotor member, said stator member including an end bracket at one end thereof, and said rotor member including a commutator positioned in said end bracket, a plurality of axially extending conducting rods supported in fixed position in the end bracket, said conducting rods being spaced apart around the circumference of the commutator, a plurality of brushholders disposed around the commutator, supporting means for holding said brushholders in fixed position relative to each other, said supporting means being carried by said conducting rods and being capable of angular adjustment relative to the commutator, means for retaining said supporting means in adjusted position, brushes in said brushholders engaging the commutator, flexible means for connecting each brush to a corresponding one of said conducting rods, and means for connecting together all the conducting rods which are connected to the brushes of one polarity.

6. In a dynamoelectric machine having a stator member and a rotor member, said stator member including an end bracket at one end thereof, and said rotor member including a commutator positioned in said end bracket, a plurality of axially extending conducting rods supported in fixed position in the end bracket, said conducting rods being spaced apart around the circumference of the commuttaor, a pair of axially spaced rings of insulating material surrounding the commutator, a plurality of brushholders disposed between said rings and rigidly secured to the rings, said rings being supported on said conducting rods and being capable of angular adjustment relative to the commutator, means for retaining said rings in adjusted position, brushes in said brushholders engaging the commutator, and flexible means for connecting each brush to a corresponding one of said conducting rods.

7. In a dynamoelectric machine having a stator member and a rotor member, said stator member including an end bracket at one end thereof, and said rotor member including a commutator positioned in said end bracket, a plurality of axially extending conducting rods supported in fixed position in the end bracket, said conducting rods being spaced apart around the circumference of the commutator, a pair of axially spaced rings of insulating material surrounding the commutator, a plurality of brushholders disposed between said rings and rigidly secured to the rings, said rings being supported on said conducting rods and being capable of angular adjustment relative to the commutator, means for retaining said rings in adjusted position, brushes in said brushholders engaging the commutator, flexible means for connecting each brush to a corresponding one of said conducting rods, and means for connecting together all the conducting rods which are connected to the brushes of one polarity.

8. A dynamoelectric machine having a stator member and a rotor member, said stator member including an end bracket at one end thereof, said rotor member including a commutator positioned in said end bracket, a first pair of axially spaced rings of insulating material, a plurality of conducting rods extending between said rings, said rods being spaced apart circumferentially of the rings and being rigidly secured in the rings, means for rigidly securing said rings in the end bracket in surrounding relation to the commutator, a second pair of axially spaced rings of insulating material surrounding the commutator, a plurality of brushholders disposed between said second pair of rings and rigidly secured thereto, said second pair of rings being supported on said conducting rods and being capable of angular adjustment relative to the commutator, means for retaining the second pair of rings in adjusted position, brushes in said brushholders engaging the commutator, and flexible means for connecting each brush to a corresponding one of said conducting bars.

9. A dynamoelectric machine having a stator member and a rotor member, said stator member including an end bracket at one end thereof, said rotor member including a commutator positioned in said end bracket, a first pair of axially spaced rings of insulating material, a plurality of conducting rods extending between said rings, said rods being spaced apart circumferentially of the rings and being rigidly secured in the rings, means for rigidly securing said rings in the end bracket in surrounding relation to the commutator, a second pair of axially spaced rings of insulating material surrounding the commutator, a plurality of brushholders disposed between said second pair of rings and rigidly secured thereto, said second pair of rings being supported on said conducting rods and being capable of angular adjustment relative to the commutator, means for retaining the second pair of rings in adjusted position, brushes in said brushholders engaging the commutator, flexible means for connecting each brush to a corresponding one of said conducting rods, and means for connecting together all the conducting rods which are connected to the brushes of one polarity.

10. A dynamoelectric machine having a stator member and a rotor member, said stator member including an end bracket at one end thereof, said rotor member including a commutator positioned in said end bracket, a first pair of axially spaced rings of insulating material, a plurality of conducting rods extending between said rings, said rods being spaced apart circumferentially of the rings and being rigidly secured in the rings, means for rigidly securing said rings in the end bracket in surrounding relation to the commutator, a second pair of axially spaced rings of insulating material surrounding the commutator, a plurality of brushholders disposed between said second pair of rings and rigidly secured thereto, said second pair of rings being supported on said conducting rods and being capable of angular adjustment relative to the commutator, means for retaining the second pair of rings in adjusted position, brushes in said brushholders engaging the commutator, flexible means for connecting each brush to a corresponding one of said conducting bars, and a conducting ring extending around the commutator, said conducting ring engaging all of the conducting rods which are connected to the brushes of one polarity and being spaced from the rods which are connected to the brushes of opposite polarity.

11. A dynamoelectric machine comprising a stator member, said stator member having pole pieces and field windings thereon and having an end bracket at one end thereof, a rotor member, said rotor member having a commutator positioned in said end bracket, a pair of rings of insulating material disposed in the end bracket and surrounding the commutator adjacent opposite ends of the commutator, a plurality of conducting rods extending between said rings and rigidly secured to the rings, said conducting rods being spaced apart circumferentially of the rings, a plurality of brushholders disposed around the commutator, supporting means for said brushholders for holding them in fixed position relative to each other, said supporting means being carried by said conducting rods and being angularly adjustable relative to the commutator, means for retaining said supporting means in adjusted position, brushes in said brushholders engaging the commutator, flexible means for connecting each brush to a corresponding one of said conducting rods, means for connecting together all the rods which are connected to the brushes of one polarity, means for connecting the rods of opposite polarity to certain of said field windings, a conducting ring supported by one of said insulating rings but not attached thereto, and leads from others of said field windings joined to said conducting ring.

12. A dynamoelectric machine comprising a stator member, said stator member having pole pieces and field windings thereon and having an end bracket at one end thereof, a rotor member, said rotor member having a commutator positioned in said end bracket, a first pair of rings of insulating material disposed in the end bracket and surrounding the commutator adjacent opposite ends of the commutator, a plurality of conducting rods extending between said rings and rigidly secured to the rings, said conducting rods being spaced apart circumferentially of the rings, a second pair of axially spaced rings of insulating material surrounding the commutator, a plurality of brushholders disposed between said second pair of rings and rigidly secured thereto, said second pair of rings being supported on said conducting rods and being capable of angular adjustment relative to the commutator, means for retaining the second pair of rings in adjusted position, brushes in said brushholders engaging the commutator, flexible means for connecting each brush to a corresponding one of said conducting rods, means for connecting together all the rods which are connected to the brushes of one polarity, means for connecting the rods of opposite polarity to certain of said field windings, a conducting ring supported by one of said first pair of insulating rings but not attached thereto, and leads from others of said field windings joined to said conducting ring.

13. Brush rigging for a dynamoelectric machine, said brush rigging comprising a first pair of rings of insulating material, a plurality of conducting rods extending between said rings and spaced apart circumferentially of the rings, said rods spacing the rings apart and being secured to the rings to form a rigid structure adapted to be secured in an end bracket of said machine, a second pair of rings of insulating material, and a plurality of brushholders extending between said second pair of rings and spaced apart circumferentially of the rings, said brushholders spacing the second pair of rings apart and being secured to the rings to form a rigid structure, said second pair of rings being carried by said conducting rods and being capable of angular movement relative to the first pair of rings.

14. Brush rigging for a dynamoelectric machine, said brush rigging comprising a first pair of rings of insulating material, a plurality of conducting rods extending between said rings and spaced apart circumferentially of the rings, said rods spacing the rings apart and being secured to the rings to form a rigid structure adapted to be secured in an end bracket of said machine, a second pair of rings of insulating material, and a plurality of brushholders extending between said second pair of rings and spaced apart circumferentially of the rings, said brushholders spacing the second pair of rings apart and being secured to the rings to form a rigid structure, said second pair of rings being carried by said conducting rods and being capable of angular movement relative to the first pair of rings, brushes in said brushholders, flexible means for connecting each brush to a corresponding one of said conducting rods, and means for connecting together all the rods which are connected to the brushes of one polarity.

15. Brush rigging for a dynamoelectric machine, said brush rigging comprising a first pair of rings of insulating material, a plurality of conducting rods extending between said rings and spaced apart circumferentially of the rings, said rods spacing the rings apart and being secured to the rings to form a rigid structure adapted to be secured in an end bracket of said machine, a second pair of rings of insulating material, and a plurality of brushholders extending between said second pair of rings and spaced apart circumferentially of the rings, said brushholders spacing the second pair of rings apart and being secured to the rings to form a rigid structure, said second pair of rings being carried by said conducting rods and being capable of angular movement relative to the first pair of rings, brushes in said brushholders, flexible means for connecting each brush to a corresponding one of said conducting rods, and a conducting ring adjacent one of said first pair of insulating rings, said conducting ring engaging all the rods which are connected to the brushes of one polarity and being spaced from the other rods.

JOSEPH E. MULHEIM.